United States Patent
Desaulniers

(10) Patent No.: US 7,782,515 B2
(45) Date of Patent: Aug. 24, 2010

(54) DIGITAL BEAM ENGINE FOR A SOFT VIDEO PROJECTOR

(75) Inventor: Jean-Marc (Joseph) Desaulniers, 9 ter, rue de l'Ic, Binic, Cotes d'Armor (FR) 22520

(73) Assignee: Jean-Marc (Joseph) Desaulniers, Binic (FR)

( * ) Notice: Subject to any disclaimer, the term of this patent is extended or adjusted under 35 U.S.C. 154(b) by 298 days.

(21) Appl. No.: 11/721,333

(22) PCT Filed: Dec. 1, 2005

(86) PCT No.: PCT/FR2005/002992

§ 371 (c)(1),
(2), (4) Date: Jun. 17, 2007

(87) PCT Pub. No.: WO2006/059007

PCT Pub. Date: Jun. 8, 2006

(65) Prior Publication Data

US 2008/0218826 A1      Sep. 11, 2008

(30) Foreign Application Priority Data

Dec. 3, 2004    (FR) .................................. 04 12838

(51) Int. Cl.
G02B 26/08    (2006.01)
(52) U.S. Cl. .................. 359/202.1; 359/201.2
(58) Field of Classification Search ........................ None
See application file for complete search history.

(56) References Cited

U.S. PATENT DOCUMENTS

| | | | | |
|---|---|---|---|---|
| 7,465,053 | B2* | 12/2008 | Taoka et al. ................... | 353/31 |
| 2001/0046033 | A1* | 11/2001 | Troyer ......................... | 353/31 |
| 2005/0141068 | A1* | 6/2005 | DeBenedictis et al. ...... | 359/196 |

* cited by examiner

*Primary Examiner*—James Phan
(74) *Attorney, Agent, or Firm*—Jackson Patent Law Office; Jerome D. Jackson

(57) ABSTRACT

The invention concerns a system enabling projection of a digital video image sequence, on a screen with different size and shape, by the mean of a light beam which can be generated by a source (1), of low/medium power laser type or of white light type, oriented by a 3D's ball-joint (2). The system contains a rotary disc micro-shutter (4) with slots (3), two optical rotary discs (5) and (7) digitally controlled on an axis (12) with 3D's ball-joints (6), generating the vertical and horizontal beam sweeping onto the screen, ended by a rectangular shutter (8). The display is realized by successive reflections of the light beam on reflective microscopic facets, covered with a thin metallic coat, and distributed on the discs surface (5) and (7). The surface of each facet is oriented with a reflective angle incremented according to an angular increment which depends on the aimed application. The reflective angle applied to the light beam by each facets, depends on: 1) the type of optical rotary disc: vertical (5) or horizontal (7), 2) the rotation speed, and 3) the position of each facet on the disc, which is function of: 1) the zone: red (9), green (10) or blue (11), the sector and the determined increment, at a given <<t>> time. The system will be applied to high end Digital Cinema supporting Ultra High Definition.

7 Claims, 4 Drawing Sheets

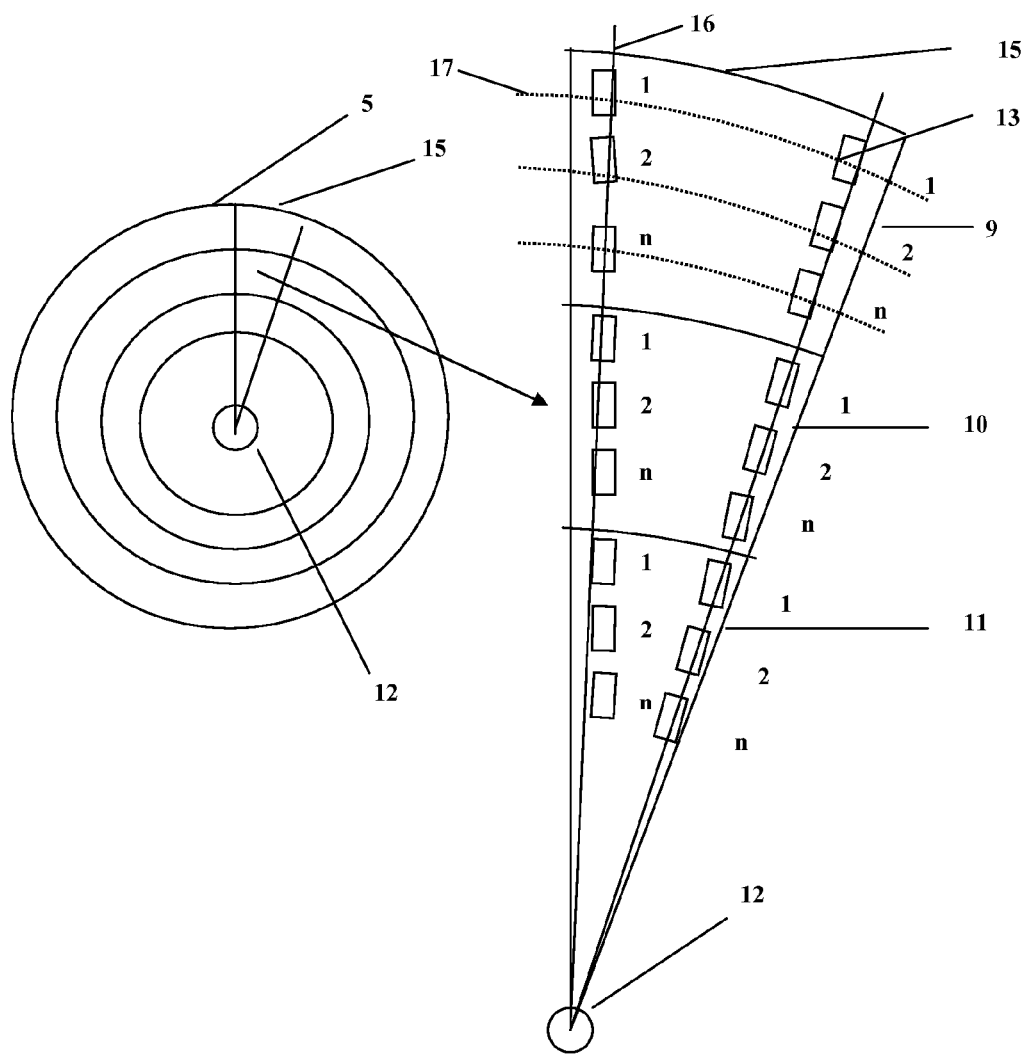
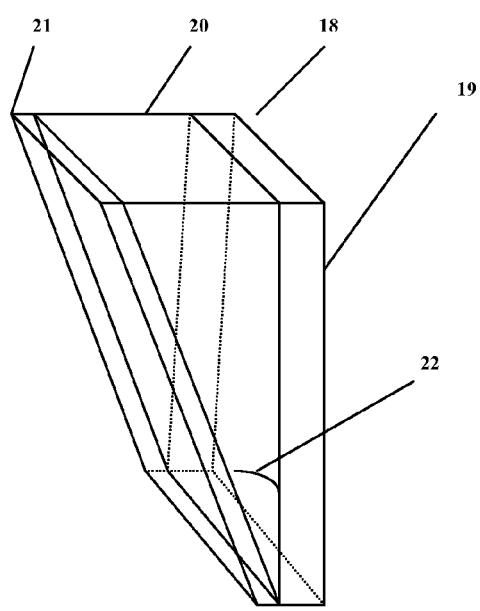
FIG. 3
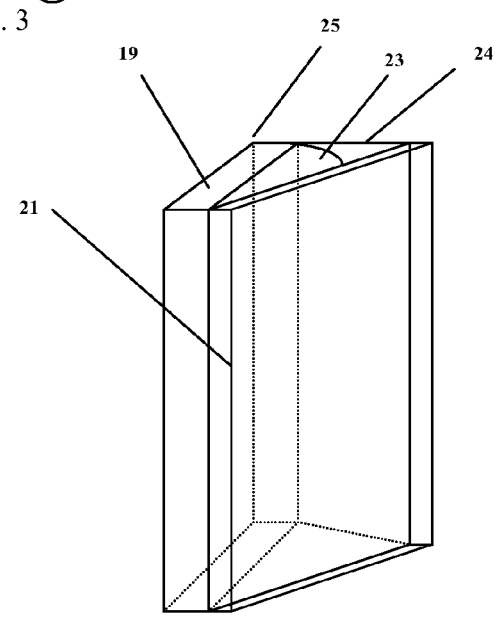
FIG. 4
FIG. 5

DIGITAL BEAM ENGINE FOR A SOFT VIDEO PROJECTOR

The current invention concerns a module corresponding to the last stage of a 2nd Generation video projector for Digital Cinema, enabling projection on a wide screen of a Ultra High Definition RGB video signal, using a laser of low/medium power or a white light generated by a xenon lamp of very high intensity, as a light source.

The projection in theaters is traditionally performed by means of a film projector 35 mm or 70 mm. A certain number of implementations based on DLP or LCD technology, that support 2K×1K pixels resolution, and a prototype, based on GLV technology that supports 4K×2K pixels resolution, are now available. Using such technologies applied to higher resolution induces exponential costs linked to the development of basic elements (DLP, LCD or GLV components). Using microscopic metallic components (DMD Micro-mirrors for DLP technology and thin micro-blades for GLV technology), induces residual magnetic field problems, resonance, early aging (resulting from multiple repetitive torsions), oxidation and limitation in terms of maximal sweeping/refreshing frequency to be reached. At LCD level, the main problems are inherent to the usage of: 1) dichroic filters inducing loss of transmission and distortion of basic color/RGB components (RGB ratio, gamut and color temperature), at the level of the recombined signal. 2) LCD shutter matrix with a limited maximal activation/deactivation frequency (shuttering cycle). These conjugated effects do not ease the optimization process to obtain the proper color mix/temperature/gamut with sufficient contrast level, required by theater users. The application range is high quality Digital Cinema oriented, in the first place, then will be re-applied to other market segments (i.e. "Home Cinema"), once the integration level of (size reduction of the sweeping/scanning mechanism) and the industrialization cost have been sufficiently optimized.

The device under patent will allow to reproduce Ultra High Definition (UHD) image sequences, from a light source, onto a screen of variable size and shape. The goal is to preserve the intrinsic characteristics of the original signal (spectrum, gamut, resolution and contrast level, . . . ) at the output.

The video projection performed by an almost entirely optical system (light beam+microscopic mirrors) is thus optimized, since it involves only a series of reflections on optical rotary discs, which in the end will experience very limited mechanical wearing.

The operating principle involves vertical and horizontal sweeping/scanning over a specific area (surface/screen of projection), by successive beam reflection, on a first disc enabling vertical scanning, then on a second disc enabling horizontal scanning. The beam will have a diameter in a range of 0.1 mm up to 2.5 mm, in compliance with targeted applications, at the last stage of the projection sub-system. Instead of using the optical disc to simply operate reading/storing of digital information, a similar physical support is used to be engraved, by e.g. a laser beam, with microscopic facets which once covered with a thin metallic layer allows reflection of a light beam, under different angles. Those angles are determined by the geometry (angle) of the flat surface associated to each facet, which are related to the position of it on the disc at specific "t" time. Successive reflections on the optical rotary discs enables to perform an efficient sweeping/scanning with minimum attenuation, refraction and diffraction problems.

Under each specific mode of implementation:

First an optical rotary disc is used for vertical scanning then a second disc for horizontal scanning, coupled with a rotary disc micro-shutter which provides the modulation rate of the light beam and a rectangular shutter to refine the limit of the frame or area of projection on the screen.

The device could be completed by additional discs in order to provide a more important angular step (easier to manufacture) on each disc.

The second optical rotary disc could be replaced by three optical rotary cylinders drums that will enable a more important angular step (upon the case the vibration at the discs level cannot be sufficiently restrained according to the available machining techniques).

Three types of light sources are envisaged: 1) white light e.g. from a xenon lamp whose color temperature could be adjusted in the range of 8500K through passage into RGB prismatic filters, currently used in "Home Cinema", 2) monochromatic laser of low/medium power, enabling to generate the three basic colors, red, green and blue, 3) white laser combined with prismatic filters to enables translation into the required spectrum, to obtain one of the basic colors (e.g. RGB).

BRIEF DESCRIPTION OF THE DRAWINGS

The invention is illustrated by the following Figures:

FIG. 3 is a view section of the optical rotary disc with aligned microscopic facets.

FIG. 4 illustrates a microscopic facet used for vertical reflection.

FIG. 5 illustrates a microscopic facet used for horizontal reflection.

Figure 1:
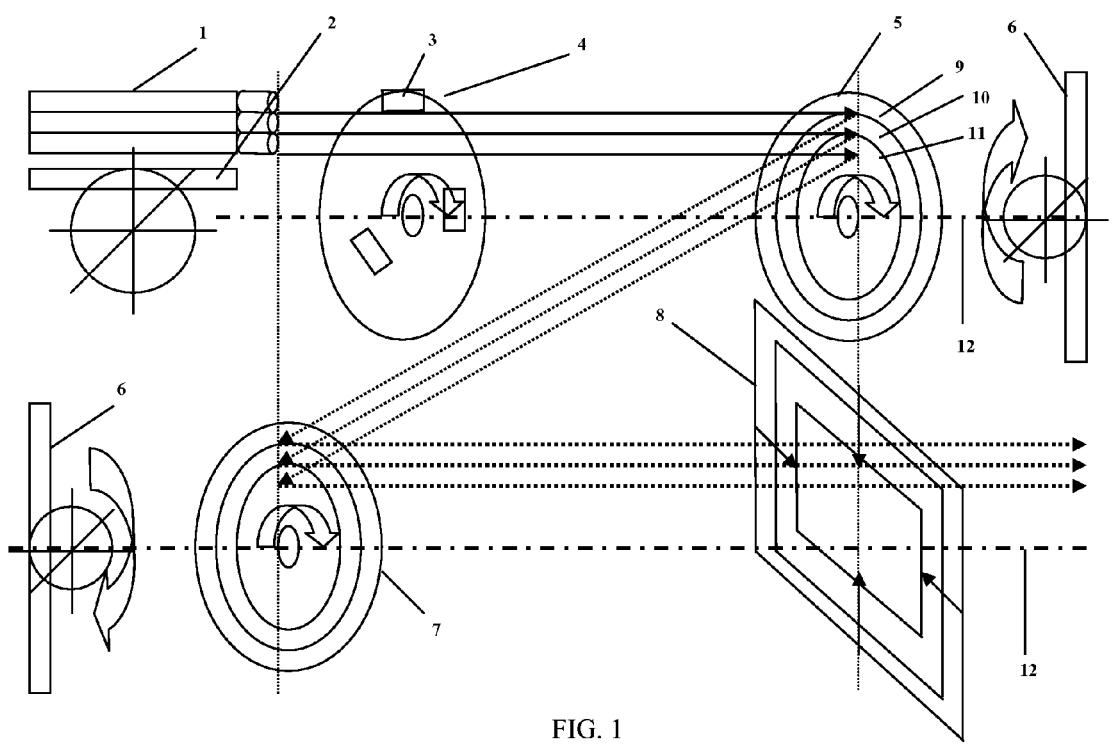
FIG. 1 is a cross-sectional view of the complete device under patent.
Figure 2:
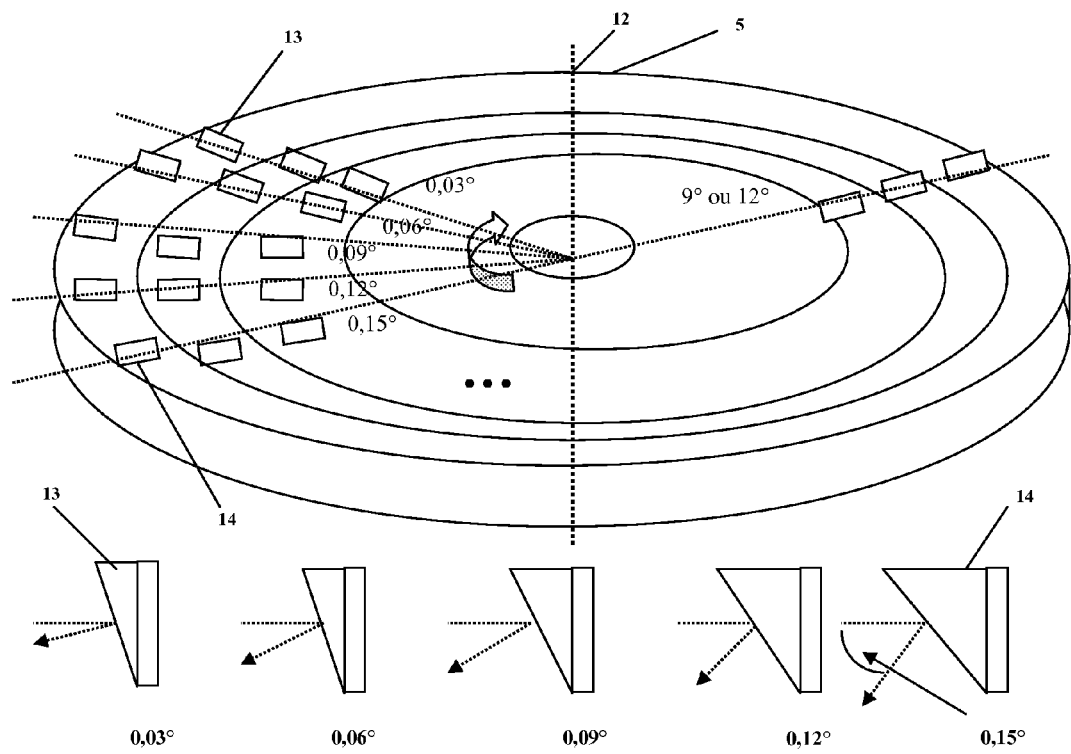
FIG. 2 is a detailed view of one of the optical rotary discs.
Figure 6:
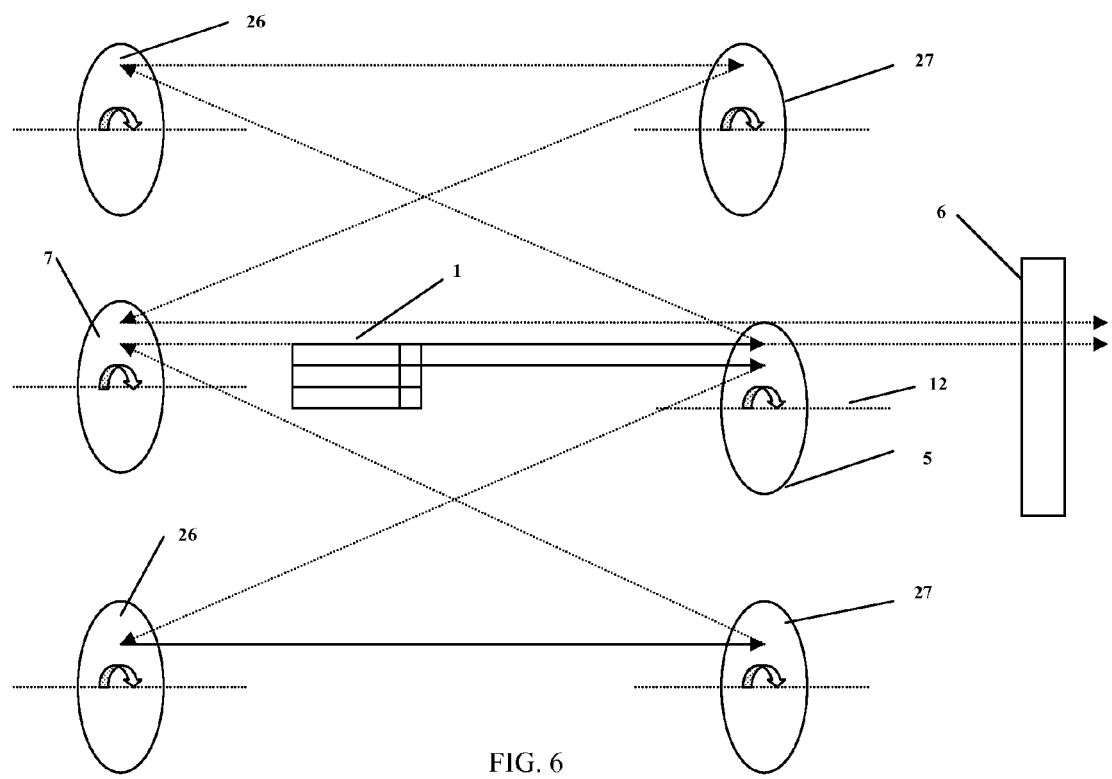
FIG. 6 illustrates a variant with several optical rotary discs with different angular steps/increments.
Figure 7:
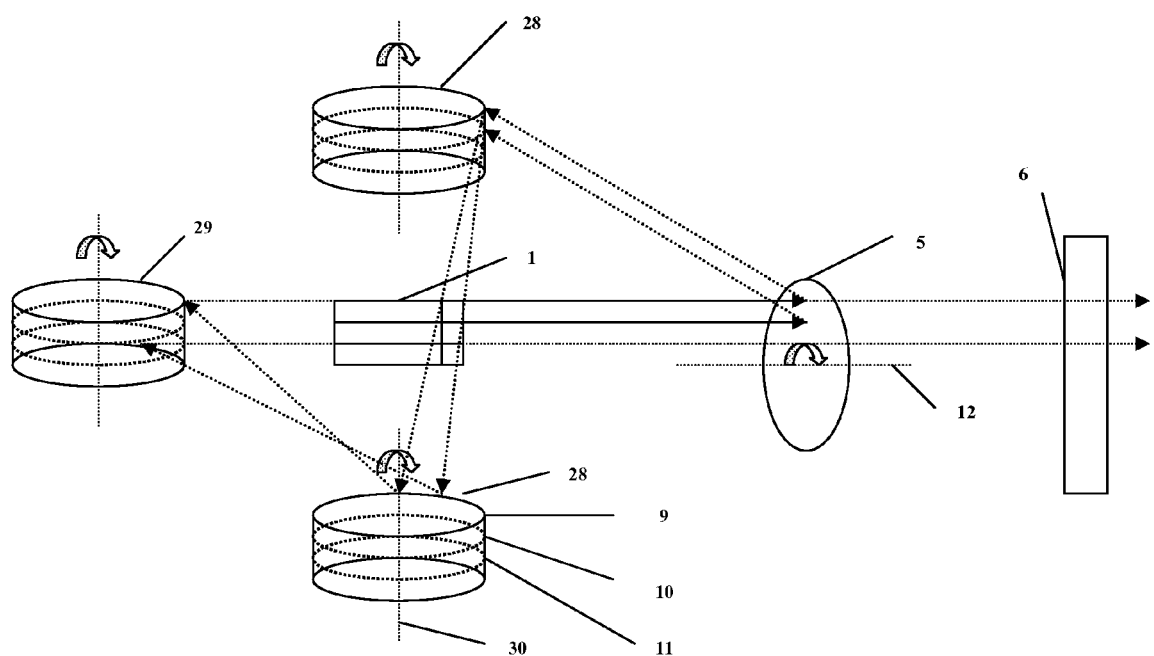
FIG. 7 illustrates a variant with several optical rotary cylinders/drums with different angular steps/increments.
Figure 8:
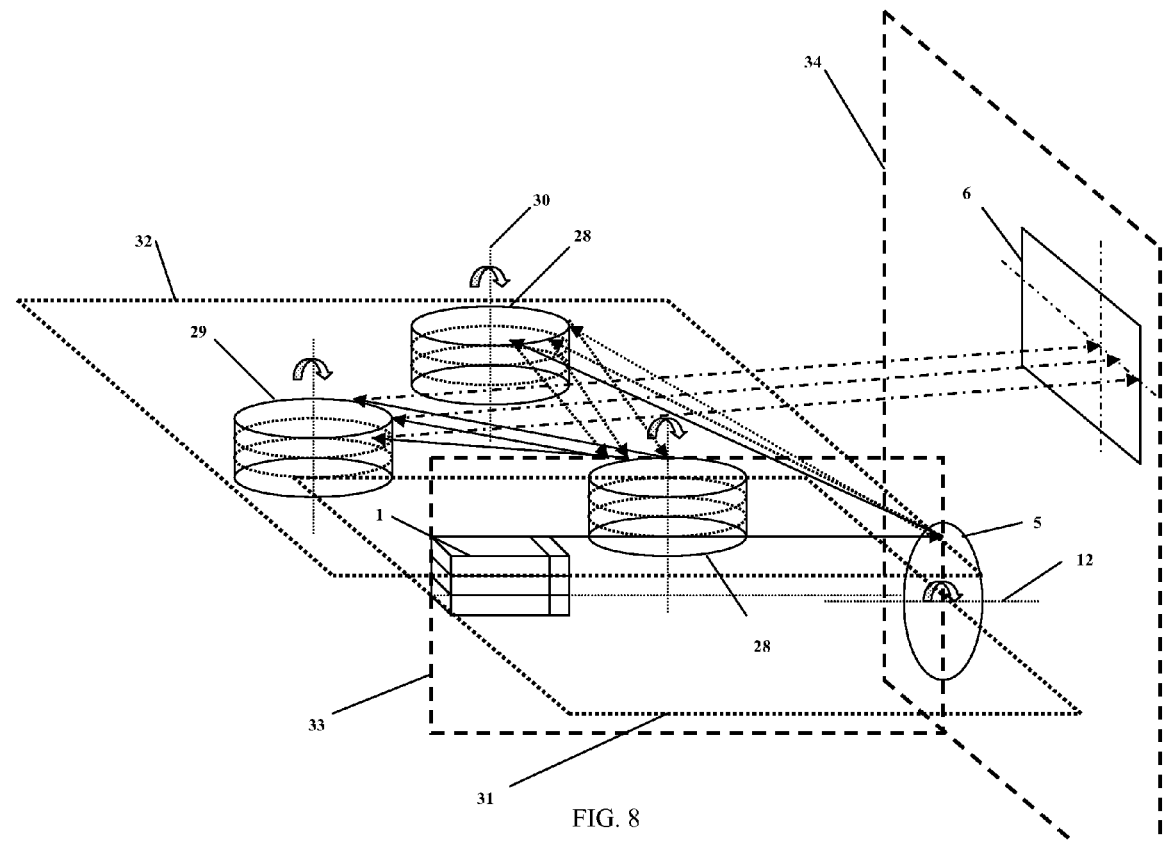
FIG. 8 illustrates both planes (horizontal/vertical) associated to variant showed FIG. 7.
Figure 9:
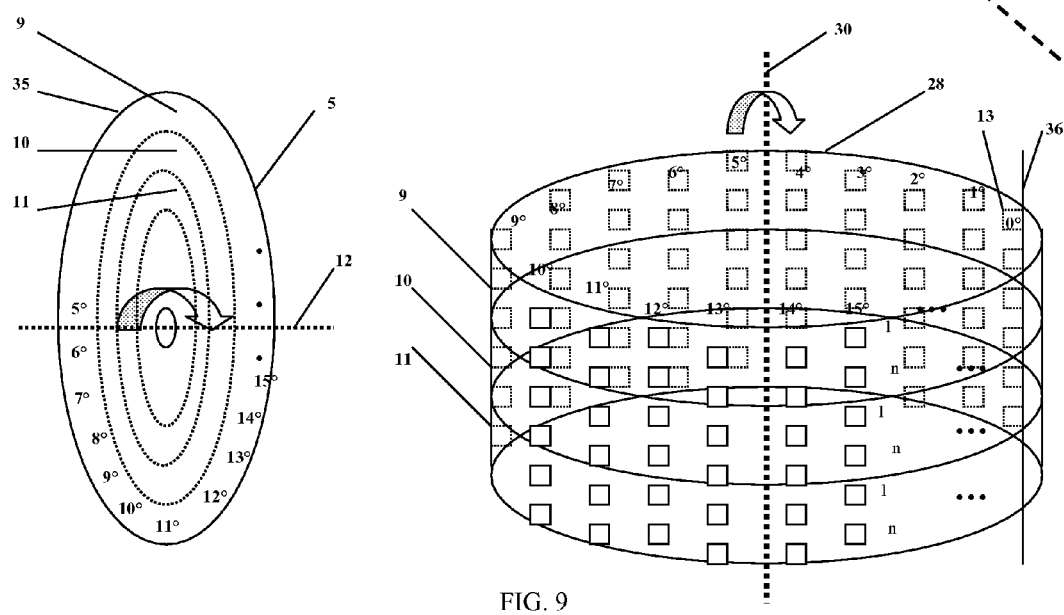
FIG. 9 is a detailed view of a disc and a cylinder/drum associated to the version showed FIG. 7 with an angular step/increment close to, e.g. 1°, 2°, 3° or 5°.

As a reference to the drawings FIG. 1, the mechanism involves, in the first place, one optical rotary disc (5), made of polymer used to manufacture CDROMs/DVDs or any other material/support with similar properties. The disc surface will comprise successive rows of microscopic mirrors (13), from approximately 24 up to 3000 in total per section (e.g. 300 per sector and e.g. 10 sectors per section) where the orientation will vary on the vertical plane e.g. from 0° to 9° by step/increment close to 0.03° (or by any other multiple or value to be defined during modelization/prototyping phase), whose have function will be to deviate the beam within the vertical plane.

A second optical rotary disc (7), having a speed of 10 up to 5000 times higher than the first disk, is dedicated to divert the beam within the horizontal plane. The disc surface contains successive rows (13) equipped with microscopic mirrors, totalizing approximately from 32 up to 5000 per section (e.g. 500 per sector and e.g. 10 sectors per section), whose orientations will vary according to the horizontal plane of about 0° up to 12° and by steps/increments of approximately 0.03° (or by any other multiple or value to be defined during the prototyping phase)

Discs (5 and 7) will be of large size in the very beginning, that is about 450 mm in diameter over the prototyping phase, then to be gradually integrated approximately down to 300 mm, then 150 mm, then 50 mm, aiming at 30 mm diameter, if compatible with integration levels, during the industrial phase, achievable with today's available engineering.

Reflective 3D facets, e.g. (13) and (14) showed in relation to the vertical plane (18) on FIG. 4, and as well as to the horizontal plane (25) on FIG. 5, with variable angles will be crafted/engraved by laser (e.g. similar technique to the one involved for cornea micro-surgery) on the polymer surface of each sector on both discs, before being covered by a very thin coat of composite (e.g. aluminum, silver or gold composite (or any other composite with sufficient reflective properties providing limited oxidation wearing), in order to build up a series of microscopic mirrors. The microscopic facets alignment (16) to be realized within a vertical plane (16) and with sector (17) from 1 to n, is illustrated in a disc section (15). The thin metallic coat (21) will cover each crafted 3D facet, that is to say on the main part (20) according to the vertical angle (22) and on the main part (24) according to the horizontal angle (23). Each of the facets being inserted/sealed in its respective mounting (19).

FIG. 1 shows both sweeping discs (5 and 7) fixed on an electronic servo-driven ball joint (6), 1D, 2D or 3D, depending on the needed micro-adjustments, and according to three axis, throughout the aiming set-up phase. A mechanical rotary disc micro-shutter (3) with variable high speed rotation electronically servo-driven will allow to pulse the light source. A LCD electronic rectangular shutter (4) or simply a mechanical micro-shutter, compatible with the 16/9 format or any other currently used format in cinema, will allow, if needed, to calibrate the shape and size of the display on the projective screen of the light beam matrix prior to the optical module output phase. The selected system will have to limit diffractive problems (side effects), in order to optimize contrast level such as sharpness of the zone associated to the border limit of the frame being projected and its periphery.

The rotation speed of both optical rotary discs will be ultra precisely controlled by a digitally controlled servomotor (similar to hard disc controller or laser CD ROM or DVD player/recorder). A compensation system using a 3D micro-motorized platform (2), if necessary could be integrated, using endless screws or hydraulic or pneumatic devices, to orientate/maintain the optical head (1) in an optimal way, taking into account the three reflection paths (resulting from double reflection). The high speed of the discs around the axis (12) will generate an important torque, that will stabilize them both across vertical and horizontal plane.

According to the light source being used, it may be necessary for the beam to go through prisms (fixed or rotary) allowing to be transmitted only one color at time. The surface of the disc under rotation will be divided into three zones (9), (10) and (11), under the case where three laser heads of small dimension (1) could be aligned facing the first disc (5), with an area/zone per color.

Alignment/guidance (currently used into laser beam optical transmission terminal equipment to perform a line of sight free-space connection), could be added in order to accurately secure the three beam sweeping (RGB) on the projection screen. The alignment targets will be made e.g. of 12 up to 20 figures with a cross shape "+". These alignment targets will be distributed, e.g. on 4 columns by 3 rows or 5 columns by 4 rows, and projected over the screen using high intensity in order to enable detection/localization of it. Such alignment target will be activated during the calibration phase prior to any projection event. A target sensor will allow to accurately locate/calibrate each group of light beams (RGB) on the projection screen, e.g. following the target alignment calculation.

The internal module of Digital Beam Engine will have to be maintained under a negative atmosphere (under partial vacuum) so as to limit the oxidation phenomena and introduction of micro-particles/dust on the discs. The discs will be replaced through regular maintenance operations.

The device should not suffer from similar limitation problems, related to refreshing/sweeping frequency that could limit the maximum resolution to could be reached, inherent to DLP/LCD matrix component technologies, or to GLV micro-blades technology. The device should enable to overcome the following problems: overheating that occurs over a certain sweeping frequency with micro-mirrors used in DLP technology, or metallic thin plates with GLV technology, or resonance phenomenon associated with vibrating metallic parts, mechanical wearing at metallic junctions, or degradation by oxidation as well as micro-dust/particle deposit on reflecting surfaces with DLP or GLV technology.

The three technologies mentioned above (DLP, LCD and GLV) induce high maintenance cost, since any malfunction results in an obligation to replace the central component. The manufacturing cost becomes prohibitive as soon as the size and level of integration of such components (DLP/LCD matrix elements and GLV number of thin plates) increase.

Other versions of implementation: In case such microscopic angular step is technically proved difficult to obtain by standard machining techniques, the proper slanted planes for the two discs, a certain number of other discs (26) and (27) or optical rotary cylinders (28) and (29), in rotation around an axis (30), could be introduced which, by a combination of reflections from different angles enables a full scan of the surface, with a higher step (35) this time, e.g. close to 1° up to 5°. The horizontal planes (31) and (32), delimit the reference planes 1) of the light source (1) and 2) of the first beam pointing to the disc (5), at the intersection of the vertical plane (34), facing the other vertical plane (33). The microscopic facets are aligned (36) according to a vertical plane on each of the optical rotary cylinders (drums).

In order to optimize/limit the number of reflecting facets on each disc, a projection technique could be used, if necessary, by spatially spreading or distributing dots belonging to each of the basic colors, developed historically for the printing industry (grouping/concentrating dots to reconstruct a sharp figure/shape when viewed from a certain distance).

Upon the selection of the configuration and the retained angular step, the system could be applied to Ultra High Definition Digital Cinema or to "Home Cinema".

The invention claimed is:

1. A Digital Beam Engine for Video Projection characterized by a laser source (1) or a source of white light (1), generating a light beam being pulsed by a rotary disc micro-shutter (4), which, by successive reflection on an alignment (16) of reflective microscopic facets (13) and (14), distributed on digitally controlled optical rotary discs (5) and (7), will generate horizontal and vertical beam sweeping/scanning.

2. A Digital Beam Engine according to claim 1 characterized by an optical rotary disc (5) containing an alignment of the microscopic reflective facets, distributed on three zones (9), (10) and (11), enabling by a succession of reflections horizontal or vertical enabling beam sweeping onto the projective screen, wherein the microscopic facets (13) and (14) are disposed in several sectors (17) from 1 to n, previously crafted by some machining technique or engraved on the disc (5) by means of a laser, before being covered by a very thin metalized coat (21) enabling light reflection, thus turning facets (13) into microscopic mirrors, where each facet is crafted, to apply a specific reflection angle determined by its position (vertical/horizontal disc, red/green/blue zone, sector's number and angular position on the sector).

3. A Digital Beam Engine according to claim 1 characterized by optical rotary discs allowing reflection of a light beam solely by hitting reflective microscopic facets/surfaces (18) and (25), all aligned within the same vertical plane and distributed on optical rotary discs (5) and (7), in order to generate a horizontal and vertical beam sweeping, where the beam path starts from the light source (1) to be reflected by the first vertical sweeping disc (5) from a specific vertical angle (22), then moves onto the second horizontal sweeping disc to be reoriented according to the vertical plane with a specific horizontal angle (23).

4. A Digital Beam Engine according to claim 1 characterized by a ball-joints (2) or (6) having a mechanism enabling a very precise control of its movement in three dimensions, to perform a perfect alignment between the light source and optical rotary discs, thus ensuring, during sweeping/scanning cycle, an optimum reflection of the light beam by the mean of microscopic facets.

5. A Digital Beam Engine according to claim 1 characterized by a rotary disc micro-shutter (4) containing a certain number of slots (3) of different dimension and position required to generate the RGB beams pulsing applied to three vertically aligned continuous sources (1), the whole system being perfectly synchronized with the optical rotary discs (5) and (7) under digital control.

6. A Digital Beam Engine according to claim 1 further comprising a pair of discs (26) facing the rotary disc (5) and a pair of discs (27) facing the rotary disc (7), which, by a combination of reflections with different angles will permit to cover the full sweeping, this time with a higher <<step>> (e.g. from 1° to 5°), that could include, a series of reflective inclined plane, fixed or movable, may be added in order to complete the angular field to be covered, when the disc surface/size do not allow to place in a sufficient necessary number of microscopic facets, in order to scan the whole surface for a given resolution.

7. A Digital Beam Engine according to claim 1 or 6 characterized by a certain number of optical rotary cylinders (28) and (29), facing a vertical sweeping optical rotary disc (5), such cylinders being equipped with microscopic reflective facets (13), that could include, a series of reflective inclined planes, fixed or movable, to be added in order to complete the angular range to be covered, when the disc surface/size does not allow to place in a sufficient number of microscopic facets, thus enabling the scan of the whole surface for a given resolution.

* * * * *